(No Model.)
W. H. WILDER.
OVEN.
No. 521,689. Patented June 19, 1894.
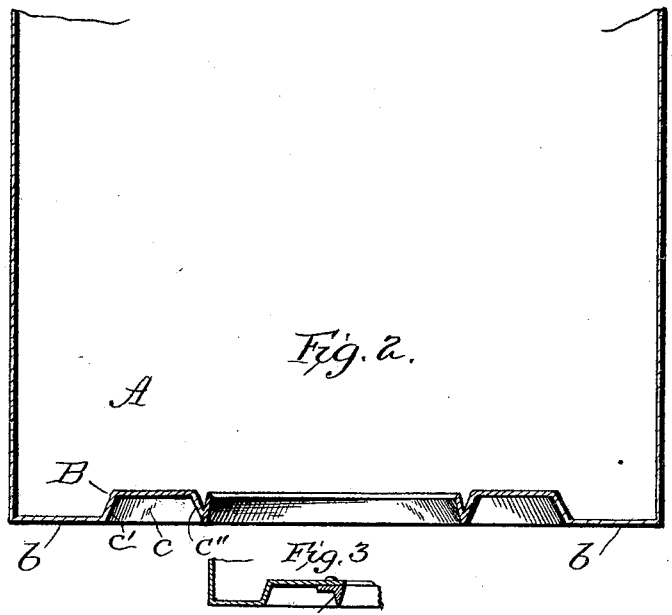
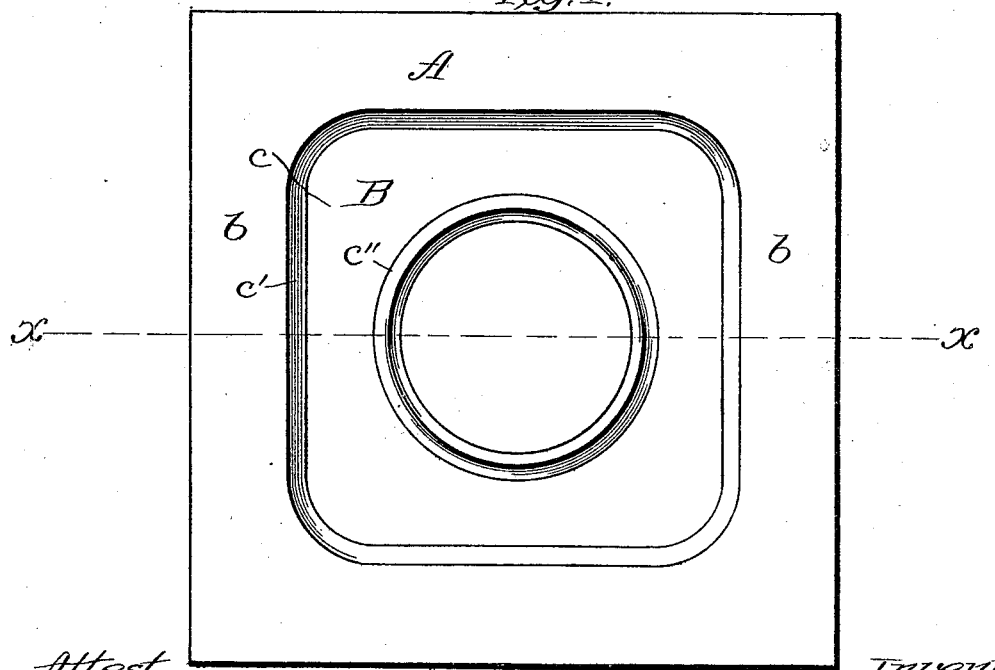

UNITED STATES PATENT OFFICE.

WILLIAM H. WILDER, OF NORTHAMPTON, MASSACHUSETTS.

OVEN.

SPECIFICATION forming part of Letters Patent No. 521,689, dated June 19, 1894.

Application filed February 25, 1893. Renewed November 21, 1893. Serial No. 491,579. (No model.)

*To all whom it may concern:*

Be it known that I, WILLIAM H. WILDER, a citizen of the United States of America, re-residing at Northampton, (Florence,) in the State of Massachusetts, have invented certain new and useful Improvements in Ovens, of which the following is a specification, reference being had therein to the accompanying drawings.

My invention relates to portable or domestic ovens designed to be used upon different forms of lamp of gas stoves or upon any flat top stove.

The object of the invention is to provide an oven with a bottom which is adapted to fit upon and over a turret or top grate of an oil or lamp stove, and which has a ring designed to hold the oven securely upon a round top stove, while at the same time the under surface of the bottom is sufficiently flat and even to enable the oven to be placed upon a flat top stove without inconvenience, thus providing an oven which will adapt itself to any form of stove upon which it is found desirable to use it.

To this end the invention consists of an oven having its bottom provided with an upwardly struck channel or depression, which channel has an approximately square outer wall and a circular inner wall.

I have illustrated an oven having its bottom formed in accordance with my invention in the accompanying drawings, in which—

Figure 1 is a plan view of the oven bottom, and Fig. 2 is a section on line $x$—$x$ of Fig. 1. Fig. 3 is a detail view of a modification.

The oven A, is formed of sheet metal and may be of any ordinary or desired form, my invention relating entirely to the bottom B, thereof. Part of this bottom is flat as at $b$, providing a broad and even bearing surface designed to support the oven upon a flat topped stove in the ordinary manner. Within this flat portion the material of the bottom is struck upwardly as at $c$, forming the channel or depression. The outer wall $c'$ of this channel or depression is approximately square and is designed to fit down over the square turret or top grate of an oil stove thus steadying the oven and preventing any displacement, while the flat level bottom of the channel forms a bearing surface which rests upon the top of the turret. The inner wall $c''$ is in the shape of a circular flange, which extends down to the level of the portion $b$, but not below it, and this flange is designed to fit into a round top stove to hold the oven securely thereon. The space within this circular flange is cut away or open to the interior of the oven to allow the passage of the hot air therethrough.

A bottom formed as above described will rest firmly and steadily upon either a round or square topped lamp stove, while at the same time sufficient flat surface is provided to enable it to rest upon a flat topped stove firmly and without straining any of the parts, and further than this the construction above described adds very materially to the strength of the bottom, making it very rigid and strong.

I do not wish to limit myself to the precise form of the inner and outer walls of the channel as these may be varied within certain limits, and the inner wall be some other form than circular, the essential feature being that the oven bottom have an opening surrounded by a plurality of bearing walls adapted to stoves of different kinds and that the bottom be practically flat or have bearings for a flat stove extending about its outer portion.

The oven may be made of sheet metal or cast or a combination of the two without departing from my invention. Fig. 3 shows a cast ring $x$ at the inner edge of the sheet metal.

I claim as my invention—

1. An oven having a channel or depression in the under face of the bottom thereof, said channel having an approximately square outer wall and a circular inner wall, substantially as described.

2. An oven having its bottom provided with a central opening and an outer flat portion with an annular depression interposed between said opening and flat portion, said annular depression having approximately square outer bounding wall and a circular inner wall, substantially as described.

3. An oven or the like having a bottom with an opening therein, an outer bearing surface for a flat top stove, and a plurality of bearing walls between said outer bearing and the opening, substantially as described.

In testimony whereof I affix my signature in presence of two witnesses.

WILLIAM H. WILDER.

Witnesses:
H. M. GATES,
W. W. TANDY.